(12) United States Patent
Hirata et al.

(10) Patent No.: US 8,602,524 B2
(45) Date of Patent: Dec. 10, 2013

(54) INK JET RECORDING METHOD AND RECORDING MATTER

(75) Inventors: Shiki Hirata, Shiojiri (JP); Takayoshi Kagata, Shiojiri (JP); Atsushi Denda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/605,002

(22) Filed: Sep. 6, 2012

(65) Prior Publication Data
US 2013/0057616 A1 Mar. 7, 2013

(30) Foreign Application Priority Data

Sep. 6, 2011 (JP) ................. 2011-194071

(51) Int. Cl.
*B41J 2/15* (2006.01)
*B41J 2/145* (2006.01)

(52) U.S. Cl.
USPC .......................................... 347/40; 347/100

(58) Field of Classification Search
USPC ....................... 347/15, 43, 95–100
See application file for complete search history.

(56) References Cited

U.S. PATENT DOCUMENTS

| | | | |
|---|---|---|---|
| 4,359,504 A | 11/1982 | Troy | |
| 4,479,718 A | 10/1984 | Alman | |
| 4,711,580 A | 12/1987 | Venable | |
| 4,880,465 A | 11/1989 | Loria et al. | |
| 7,500,744 B2 * | 3/2009 | Shastry et al. | 347/100 |
| 7,763,108 B2 | 7/2010 | Oyanagi et al. | |
| 2005/0235870 A1 | 10/2005 | Ishihara | |
| 2008/0182085 A1 | 7/2008 | Oyanagi et al. | |
| 2010/0086690 A1 | 4/2010 | Aoki | |
| 2012/0156449 A1 | 6/2012 | Tateishi et al. | |

FOREIGN PATENT DOCUMENTS

| | | |
|---|---|---|
| JP | 2002-225255 A | 8/2002 |
| JP | 2003-292836 A | 10/2003 |
| JP | 2008-208330 A | 9/2008 |
| WO | 2011-027842 A1 | 3/2011 |

\* cited by examiner

*Primary Examiner* — Thinh Nguyen
(74) *Attorney, Agent, or Firm* — Nutter McClennen & Fish LLP; John J. Penny, V.

(57) ABSTRACT

An ink jet recording method according to an aspect of the invention includes: discharging droplets of a glitter ink composition containing a glitter pigment onto a recording medium to form a glitter region on the recording medium; and discharging a colored ink composition containing a colorant onto the glitter region to form a colored glitter region on the recording medium, wherein when light is irradiated on the colored glitter region at an angle of 45 degrees, with a normal direction with respect to the colored glitter region as 0 degrees, the ratio [(C*45°)/(C*0°)] between the saturation of the colored glitter region measured based on light reflected at an angle of −45 degrees (C*45°) and the saturation of the colored glitter region measured based on light reflected at an angle of 0 degrees (C*0°) is equal to or greater than 1.

14 Claims, 2 Drawing Sheets

INK JET RECORDING METHOD AND RECORDING MATTER

Priority is claimed under 35 U.S.C. §119 to Japanese Application No. 2011-194071 filed on Sep. 6, 2011, is hereby incorporated by reference in its entirety.

BACKGROUND

1. Technical Field

The present invention relates to an ink jet recording method and a recording matter obtained therewith.

2. Related Art

In the related art, hot stamping printing using printing ink, using gold powder and silver powder created from brass, aluminum fine particles, and the like as a pigment, or a metallic foil, a thermal transfer method using a metallic foil, and the like have been used as techniques of forming a coated film with metallic gloss on a recording medium.

In recent years, there have been many application examples for an ink jet recording method in printing, and metallic printing for obtaining an image with metallic gloss is known as one such application example. For example, obtaining an image with metallic gloss using an ink containing metallic fine particles is described in JP-A-2003-292836.

However, there were cases where images obtained using the ink described in JP-A-2003-292836 did not have excellent metallic gloss. In particular, there were cases where it was difficult to record an image with excellent reproduction of color phases from colorants and excellent metallic gloss from a glitter pigment.

SUMMARY

An advantage of some aspects of the invention is to provide an ink jet recording method with which an image with excellent colored metallic gloss is obtained.

The invention can be realized in the following forms or application examples.

APPLICATION EXAMPLE 1

According to Application Example 1, there is provided an ink jet recording method including: discharging droplets of a glitter ink composition containing a glitter pigment onto a recording medium to form a glitter region on the recording medium; and discharging a colored ink composition containing a colorant onto the glitter region to form a colored glitter region on the recording medium, wherein when light is irradiated on the colored glitter region at an angle of 45 degrees, with a normal direction with respect to the colored glitter region as 0 degrees, the ratio $[(C^*45°)/(C^*0°)]$ between the saturation of the colored glitter region measured based on light reflected at an angle of −45 degrees ($C^*45°$) and the saturation of the colored glitter region measured based on light reflected at an angle of 0 degrees ($C^*0°$) is equal to or greater than 1.

According to the ink jet recording method of Application Example 1, an image with excellent colored metallic gloss is obtained.

APPLICATION EXAMPLE 2

In the ink jet recording method according to Application Example 1, the 60° specular gloss of the colored glitter region is equal to greater than 100.

APPLICATION EXAMPLE 3

In the ink jet recording method according to Application Example 1 or Application Example 2, the 60° specular gloss of the glitter region is equal to greater than 250.

APPLICATION EXAMPLE 4

In the ink jet recording method according to any one of Application Examples 1 to 3, the concentration of chlorine included in the recording medium is equal to or less than 10 mass %.

APPLICATION EXAMPLE 5

In the ink jet recording method according to any one of Application Examples 1 to 4, the ratio (W2/W1) between the amount of the glitter pigment included in the glitter region [W1 (mg/inch$^2$)] and the amount of the colorant included in the colored glitter region [W2 (mg/inch$^2$)] is equal to or greater than 0.1 and equal to or less than 1.5.

APPLICATION EXAMPLE 6

In the ink jet recording method according to any one of Application Examples 1 to 5, the glitter ink composition and the colored ink composition further contain water.

APPLICATION EXAMPLE 7

In the ink jet recording method according to any one of Application Examples 1 to 6, a head including a nozzle row formed of a plurality of nozzle holes is included, a carriage scanning the head in a main scanning direction is included, the nozzle row includes a first nozzle row formed by arranging a plurality of nozzle holes for discharging the glitter ink composition in a sub scanning direction intersecting the main scanning direction, and a second nozzle row formed by arranging a plurality of nozzle holes for discharging the colored ink composition in the sub scanning direction, the first nozzle row and the second nozzle row are used by being split into each group including a predetermined number of nozzle holes toward the sub scanning direction, the groups include a first group located to the upstream side in the sub scanning direction and a second group located further to the downstream side than the first group in the sub scanning direction, forming the glitter region is performed by discharging the glitter ink composition from the first group of the first nozzle row, to form the colored glitter region is performed by discharging the colored ink composition from the second group of the second nozzle row.

APPLICATION EXAMPLE 8

One aspect of recording matter according to an aspect of the invention is obtained by the ink jet recording method according to any one of Application Examples 1 to 7.

According to the recording matter of Application Example 8, the colored metallic gloss is excellent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
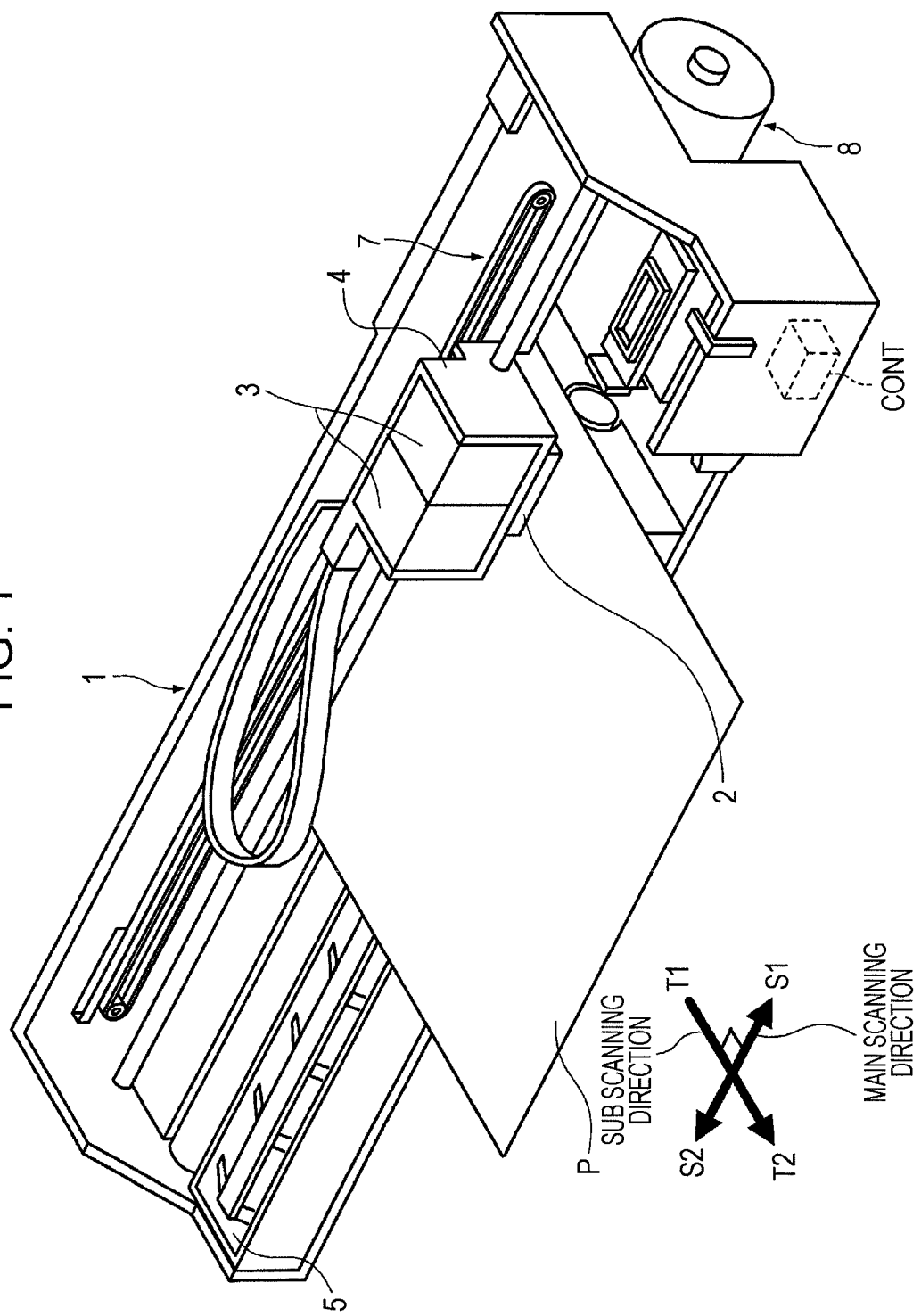
FIG. 1 is a perspective view illustrating the configuration of a printer used in an ink jet recording method according to an aspect of the invention.

Preferable embodiments of the invention will be described below. The embodiments described below describe an example of the invention. Further, the invention is not limited to the following embodiments, and includes various modification examples embodied without departing from the gist of the invention.

1. INK COMPOSITION

An ink jet recording method according to an embodiment of the invention is performed using a glitter ink composition and a colored ink composition. First, the glitter ink composition and the colored ink composition used in the ink jet recording method according to the present embodiment will be described.

1.1. Glitter Ink Composition

The glitter ink composition used in the ink jet recording method according to the present embodiment (hereinafter also simply referred to as a "glitter ink composition") contains a glitter pigment.

1.1.1. Glitter Pigment

Although the glitter pigment is not particularly limited as long as there is glitter when attached on a medium, examples thereof include one or two or more types of alloys selected from a group including aluminum, silver, gold, platinum, nickel, chromium, tin, zinc, indium, titanium, and copper, and a pearl pigment with pearl gloss. Typical examples of a pearl pigment include pigments with pearl gloss or interference gloss such as titanium dioxide coated mica, a fish scale foil, and bismuth acid chloride. Further, surface treatment for suppressing reaction with water may be performed on the glitter pigment. An image with excellent glitter can be formed by the ink composition including a glitter pigment.

It is preferable that the content amount of the glitter pigment be equal to or greater than 1 mass % and equal to or less than 20 mass % with respect to the total mass of the glitter ink composition, and equal to or greater than 1 mass % and equal to or less than 15 mass % is more preferable. If the content amount of the glitter pigment is in the ranges described above, an image with excellent glitter can be formed.

It is preferable that the glitter ink composition according to the present embodiment use aluminum particles or silver particles as the glitter pigment, and silver particles are more preferable. In a case where silver particles are contained in the glitter pigment, the silver particles are supplied, for example, as the silver particle aqueous dispersion below. Here, the silver particles may not necessarily be supplied in the form of an aqueous dispersion, and as long as dispersibility is ensured, the silver particles may be supplied in powder form.

The silver particle aqueous dispersion includes silver particles and water. The silver particles included in the silver particle aqueous dispersion of the present embodiment are particles with silver as the principal component. The silver particles may include other metals, oxygen, carbon, and the like, for example, as accessory components. The purity of the silver in the silver particles can be equal to or greater than 50%, for example. The silver particles may also be an alloy of silver and another metal. Further, the silver particles in the silver particle aqueous dispersion may be in a colloidal (particle colloidal) state. In a case where the silver particles are dispersed in a colloidal state, the dispersibility is even more favorable, which contributes to an improvement in the silver particle aqueous dispersion and the storage stability in a case where the silver particle aqueous dispersion is mixed into an ink composition.

An example of a preferable embodiment of aluminum particles is described in U.S. Pat. No. 7,763,108.

1.1.2 Other Components

The glitter ink composition according to the present embodiment may contain water, a water-soluble organic solvent, a surfactant, and a resin.

Water

It is preferable that pure water or ultrapure water such as ion-exchanged water, ultrafiltered water, reverse osmosis water, and distilled water be used as the water. In particular, water in which the waters above are sterilization treated through ultraviolet irradiation, addition of hydrogen peroxide, or the like is preferable as the appearance of molds and bacteria is prevented over a long period.

Water-Soluble Organic Solvent

Examples of the water-soluble organic solvent include a polyvalent alcohol, a pyrrolidone derivative, and the like. One type of water-soluble organic solvent may be used alone, or two or more types may be used in combination.

Examples of the polyvalent alcohol include ethylene glycol, diethylene glycol, triethylene glycol, polyethylene glycol, polypropylene glycol, dipropylene glycol, propylene glycol, butylene glycol, 1,2-butanediol, 1,2-pentanediol, 1,5-pentanediol, 1,2-hexanediol, 2-ethyl-1,3-hexanediol, 1,6-hexanediol, 1,2-heptanediol, 1,2-octanediol, 1,2,6-hexanetriol, thioglycol, hexylene glycol, glycerin, trimethylolethane, trimethylolpropane, and the like. Such polyvalent alcohols have the effect of preventing the ink composition from drying and reducing clogging of the nozzle holes.

It is preferable that the content amount of the polyvalent alcohol be equal to or greater than 1 mass % and equal to or less than 30 mass % with respect to the total mass of the glitter ink composition. If the content amount of the polyvalent alcohol is within the range above, there may be a case where the effect of reducing clogging in the nozzle holes and the like increases yet further.

Examples of the pyrrolidone derivative include N-methyl-2-pyrrolidone, N-ethyl-2-pyrrolidone, N-vinyl-2-pyrrolidone, 2-pyrrolidone, 5-methyl-2-pyrrolidone, and the like.

Surfactant

A surfactant can suitably maintain the surface tension of the ink composition and the interfacial tension with printer members coming into contact with ink such as the nozzles. Therefore, in a case where a surfactant is used in the ink jet recording apparatus, discharge stability can be increased. Further, a surfactant has the effect of evenly wet-spreading the ink on a recording medium so there is no grayscale unevenness or bleeding.

It is preferable that a surfactant with such an effect be a nonionic surfactant. Out of nonionic surfactants, one or both of a silicone-based surfactant and an acetylene glycol-based surfactant are more preferable.

A polysiloxane compound is preferably used as the silicone-based surfactant, examples of which include a polyether-modified organosiloxane and the like. In more detail, examples include BYK-306, BYK-307, BYK-333, BYK-341, BYK-345, BYK-346, BYK-348 (all product names, manufactured by BYK Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all product names, manufactured by Shin-Etsu Chemical Co., Ltd.), and the like. In a case where a silicone-based surfactant is contained, it is preferable that the content amount be equal to or greater than 0.1 mass % and equal to or less than 2 mass % with respect to the total mass of the glitter ink composition.

Examples of acetylene glycol-based surfactants include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all product names, manufactured by Air Products and Chemicals, Inc.), Olefin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (all product names, manufactured by Nissin Chemical Co., Ltd.), Acetylenol E00, E00P, E40, E100 (all product names, manufactured by Kawaken Fine Chemicals Co., Ltd.), and the like. In a case where an acetylene glycol-based surfactant is contained, it is preferable that the content amount be equal to or greater than 0.1 mass % and equal to or less than 2 mass % with respect to the total mass of the ink composition.

Here, other than the surfactants described above, an anionic surfactant, a nonionic surfactant, an amphoteric surfactant, or the like may be further added.

Resin

The glitter ink composition may contain a resin. Examples of resins include known resins such as an acrylic resin, a styrene acrylic resin, a fluorene resin, an urethane resin, a polyolefin resin, a rosin-modified resin, a terpene resin, a polyester resin, a polyamide resin, an epoxy resin, a vinyl chloride resin, a vinyl chloride-acetic acid vinyl copolymer, and an ethylene vinyl acetate resin, a polyolefin wax, and the like. One type of resin may be used alone or two or more types may be used in combination. The resins can improve the adhesion and abrasion resistance of the ink composition with respect to the recording medium, and can improve the dispersibility of the glitter pigment within the ink composition.

Other Components

The glitter ink composition can further contain an osmotic agent, a pH adjusting agent, an antiseptic and antifungal agent, a corrosion inhibitor, a chelating agent, and the like. When the glitter ink composition contains such chemicals, there may be a case where the properties thereof improve further.

An osmotic agent has the effect of further improving the wettability of the ink composition with respect to the recording medium and allowing even spreading. In so doing, grayscale unevenness and bleeding of the ink of a formed image can be reduced further. Examples of osmotic agents include glycol ethers, monovalent alcohols, and the like.

Examples of glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, and the like.

Examples of monovalent alcohols include water-soluble types such as methanol, ethanol, n-propyl alcohol, iso-propyl alcohol, 2,2-dimethyl-1-propanol, n-butanol, 2-butanol, tert-butanol, iso-butanol, 2-methyl-1-butanol, 3-methyl-1-butanol, 3-methyl-2-butanol, n-pentanol, 2-pentanol, 3-pentanol, tert-pentanol, and the like.

Examples of pH adjusting agents include potassium dihydrogen phosphate, disodium hydrogen phosphate, sodium hydroxide, lithium hydroxide, potassium hydroxide, ammonia, diethanolamine, triethanolamine, tri-isopropanolamine, potassium carbonate, sodium carbonate, sodium hydrogen carbonate, and the like.

Examples of antiseptic and antifungal agents include sodium benzoate, sodium pentachlorophenol, sodium 2-pyridinethiol-1-oxide, sodium sorbate, sodium dehydroacetic acid, 1,2-dibenzisothiazolin-3-one, and the like. Examples of commercially available products include Proxel XL2, Proxel GXL (both product names, manufactured by Nitto Denko Avecia Inc.), Denicide CSA, NS-500W (both product names, manufactured by Nagase ChemteX Corporation), and the like.

Examples of corrosion inhibitors include benzotriazole and the like.

Examples of chelating agents include ethylenediaminetetraacetic acid and salts thereof (ethylenediaminetetraacetic acid disodium dihydrogen salt and the like) and the like.

1.2. Colored Ink Composition

The colored ink composition used in the ink jet recording method according to the present embodiment (hereinafter also simply referred to as a "colored ink composition") contains a colorant.

1.2.1 Colorant

While the colorant is not particularly limited, examples thereof include a dye, a pigment, a white-based coloring material, and the like. The content amount of the colorant is preferably equal to or greater than 1 mass % and equal to or less than 20 mass % with respect to the total mass of the ink composition, and more preferably is equal to or greater than 1 mass % and equal to or less than 15 mass %.

The dyes and pigments described in U.S. Patent Application Publication No. 2010/0086690, U.S. Patent Application Publication No. 2005/0235870, International Publication No. 2011/027842, and the like can be favorably used. Of dyes and pigments, including a pigment is even more preferable. It is preferable that a pigment be an organic pigment from the viewpoint of storage stability such as light resistance, weather resistance, and gas resistance.

Specifically, an azo pigment such as an insoluble azo pigment, a condensed azo pigment, azo lake, or a chelated azo pigment, a polycyclic pigment such as a phthalocyanine pigment, a perylene and perinone pigment, an anthraquinone pigment, a quinacridone pigment, a dioxane pigment, a thioindigo pigment, an isoindolinone pigment, or a quinophthalone pigment, a chelated dye, a lake dye, a nitro pigment, a nitroso pigment, aniline black, a daylight fluorescent pigment, or the like is used as a pigment. One type of the pigments above may be used alone, or two or more types may be used in combination.

Further, various dyes usually used in ink jet recording such as, for example, a direct dye, an acid dye, an edible dye, a basic dye, a reactive dye, a disperse dye, a vat dye, a soluble vat dye, and a reaction disperse dye can be used as the dye.

Examples of the white-based coloring material include metal oxides, barium sulfate, calcium carbonate, and the like. Examples of metal oxides include titanium dioxide, zinc oxide, silica, alumina, magnesium oxide, and the like. Further, the white-based coloring material includes particles with hollow structures, and particles with hollow structures are not particularly limited and known particles can be used. The particles described in U.S. Pat. No. 4,880,465 and the like, for example, can be favorably used as the particles with hollow structures.

1.2.2. Other Components

The colored ink composition can contain other components (water, a water-soluble organic solvent, a surfactant, a resin, an osmotic agent, a pH adjusting agent, an antiseptic and antifungal agent, a corrosion inhibitor, a chelating agent, and the like) described in the description of the glitter ink composition. Since specific examples of the other components have been described for the glitter ink composition, description thereof will be omitted. Here, the content amounts of the other components in the colored ink composition can be included in the same ranges as in the description of the glitter ink composition. Further, the effects that the other components have are also the same as the effects described for the glitter ink composition.

2. INK JET RECORDING APPARATUS

An ink jet recording method according to the present embodiment can be embodied using an ink jet recording apparatus.

An ink jet recording apparatus usable in the ink jet recording method according to the present embodiment (hereinafter also referred to simply as an "ink jet recording apparatus") will be described below with reference to FIGS. 1 and 2. Here, in each drawing used in the following description, the dimensions of each member are changed as appropriate so that each member is a size that can be recognized. In the present embodiment, an ink jet printer (hereinafter simply referred to as a "printer") is exemplified as an ink jet recording apparatus.

FIG. 1 is a perspective view illustrating the configuration of a printer 1 according to the present embodiment. The printer 1 illustrated in FIG. 1 is a serial printer. A serial printer has a head mounted on a carriage moving in a predetermined direction, and droplets are discharged onto a recording medium by the head moving along with the movement of the carriage.

As illustrated in FIG. 1, the printer 1 includes a carriage 4 on which a head 2 is mounted and an ink cartridge 3 is fitted to be detachable, a platen 5 placed to the lower side of the head 2 and to which a recording medium P is transported, a carriage movement mechanism 7 that moves the carriage 4 in the medium width direction of the recording medium P, and a medium transfer mechanism 8 transporting the recording medium P in a medium transfer direction. Further, the printer 1 includes a control unit CONT controlling the overall operation of the printer 1. Here, the medium width direction is the main scanning direction (head scanning direction). The medium transfer direction is the sub scanning direction (direction orthogonal to the main scanning direction).

The control unit CONT can perform execution operations of controlling and coordinating the execution timings and the like of each operation of the carriage 4, the head 2, the carriage movement mechanism 7, the medium transfer mechanism 8, and the like described above.

The head 2 causes the ink composition to be discharged as droplets with small particle diameters from nozzle holes 17 onto the recording medium P. As long as the function described above is included, there is no particular limitation, and any ink jet recording system may be used. Examples of the ink jet recording system of the head 2 include a system of recording by applying an intense electric field between nozzles and acceleration electrodes placed in front of the nozzles, causing ink in droplet form to be continuously discharged from the nozzles, and conferring a printing information signal to polarization electrodes while the ink droplets are in flight between the polarization electrodes or a system of causing ink droplets to be discharged according to the printing information signal without being polarized (electrostatic suction system), a system of forcibly discharging ink droplets by applying pressure on the ink liquid using a small pump and mechanically vibrating the nozzles using a crystal oscillator or the like, a system of discharging ink droplets and recording by applying pressure and a printing information signal to the ink at the same time using a piezoelectric element (piezo system), a system of discharging ink droplets and recording by heating and foaming the ink according to a printing information signal using miniscule electrodes (thermal jet system), and the like.

Figure 2:
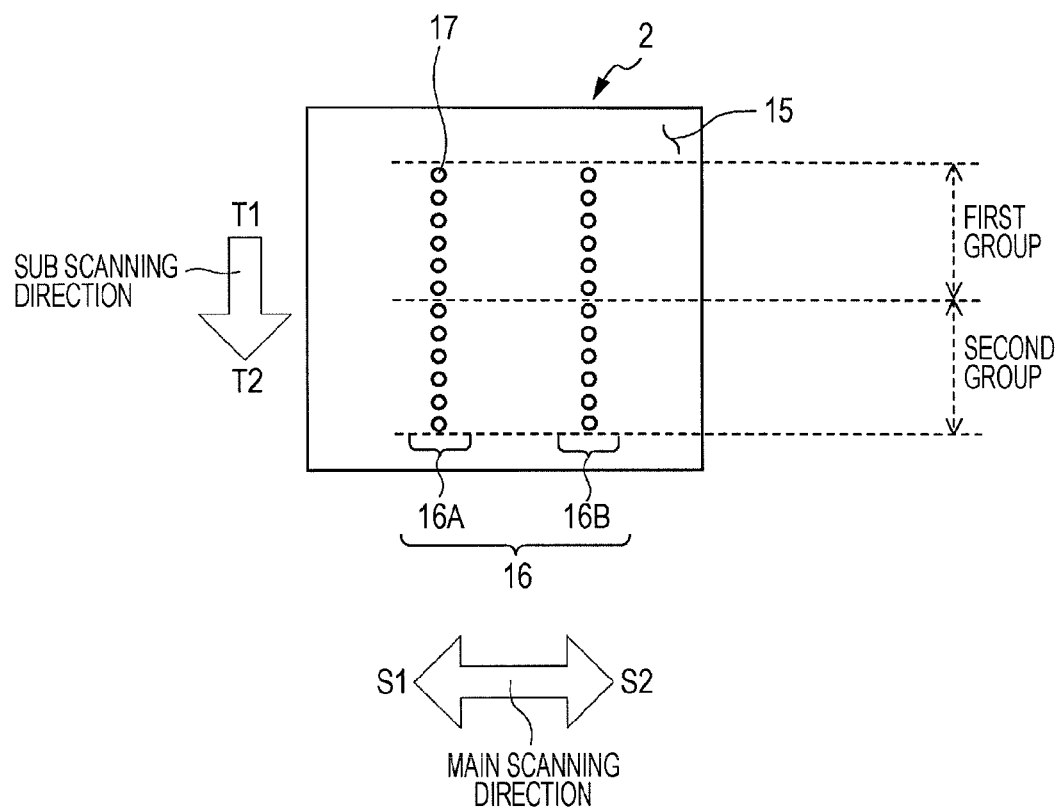
FIG. 2 is an outline view illustrating the nozzle face of a printer used in the ink jet recording method according to an aspect of the invention.

FIG. 2 is an outline view illustrating a nozzle face 15 of the head 2 according to the present embodiment. As illustrated in FIG. 2, the head 2 includes the nozzle face 15. A plurality of nozzle rows 16 are arranged on the nozzle face 15, which is also the ink discharge face. The plurality of nozzle rows 16 include a plurality of nozzle holes 17 for discharging ink for each nozzle row.

The plurality of nozzle rows 16 can discharge ink with different compositions, for example, for each nozzle row. In the example of FIG. 2, there are two rows of nozzle rows provided to correspond with the ink compositions, and each nozzle row is arranged along the main scanning direction. Specifically, there is a nozzle row 16A that can discharge the glitter ink composition described above and a nozzle row 16B that can discharge the colored ink composition described above. While a case where there are two nozzle rows is illustrated in the example of FIG. 2, without being limited thereto, three or more nozzle rows may be included.

While the nozzle rows 16A and 16B respectively extend in the sub scanning direction intersecting the main scanning direction on the nozzle face 15 in the example of FIG. 2, without being limited thereto, the nozzle rows 16A and 16B may be arranged with an angle applied to a direction intersecting the main scanning direction within the nozzle face 15.

The nozzle holes 17 form nozzle rows by being arranged in plurality in a predetermined pattern. While the nozzle holes 17 are formed by being arranged in plurality in the sub scanning direction on the nozzle face 15 in the present embodiment, without being limited thereto, the nozzle holes 17 may be arranged, for example, in zigzag form along a direction orthogonal to the main scanning direction on the nozzle face 15. Here, the number of nozzle holes 17 configuring a nozzle row is not particularly limited.

The plurality of nozzle rows 16 can be used by being split into a plurality of regions including a predetermined number of nozzle holes 17 toward the sub scanning direction. In the example of FIG. 2, the nozzle rows 16A and 16B are formed of a first group located to an upstream side T1 in the sub scanning direction and a second group located further to a downstream side T2 than the first group in the sub scanning direction. Here, the number of nozzle holes 17 configuring one group is not particularly limited. Further, the number of nozzle holes 17 configuring a group may be the same or may be different for each group. Further, the nozzle rows may be used by being split into three or more ways.

While a serial head type printer (recording apparatus) has mainly been described as described above, the invention is not limited to such an aspect. Specifically, the recording apparatus may be a line head type printer in which the recording head is fixed and lines are arranged in order in the sub scanning direction, or a lateral type printer including a head (carriage) provided with a mechanism moving in an X direction and a Y direction (mains scanning direction, sub scanning direction) as described in JP-A-2002-225255. For example, SurePress L-4033A (manufactured by Seiko Epson Corporation) is a lateral type printer. The aspects of the invention are preferable since a recording apparatus recording an image by splitting up the nozzle rows of a serial head described later or a lateral type recording apparatus favorably forms a glitter region using the glitter ink composition discharged first, before favorably forming a colored glitter region using the colored ink composition discharged later.

3. INK JET RECORDING METHOD

An aspect of the ink jet recording method according to an aspect of the invention includes forming the glitter region on the recording medium by discharging droplets of the glitter ink composition described above on a recording medium, and forming the colored glitter region on the recording medium by discharging the colored ink composition described above on the glitter region.

3.1. Recording Method

While the ink jet recording method according to the present embodiment will be described with a case where the printer 1 described above is used as an example, the invention is not limited to the aspect. Here, an "image" in the aspect of the invention indicates a printing pattern formed of dot (droplet) groups, and includes text printing and solid printing.

First, glitter ink composition droplets are adhered to the recording medium P by causing the glitter ink composition droplets to be discharged from the nozzle holes 17 of the nozzle row 16A while moving the carriage 4 in the main scanning direction. In so doing, a glitter region (glitter image) formed of the glitter ink composition is formed on the recording medium P.

Next, by causing color ink composition droplets to be discharged from the nozzle holes 17 of the nozzle row 16B onto the glitter region while moving the carriage 4 in the main scanning direction, recording matter on which a colored glitter region (colored glitter image) is formed is obtained. The colored glitter region is an image including a layer formed of a glitter image formed on the recording medium and a layer formed of a colored image formed on the layer formed of the glitter image. A colored glitter region obtained in such a manner has excellent colored metallic gloss.

In the ink jet recording method according to the present embodiment, it is preferable that the colored ink composition be discharged at a timing to avoid mixing with the glitter ink composition droplets on the recording medium. That is, colored ink composition droplets may be adhered to the surface of the layer formed of the glitter image after the surface of the layer formed of the glitter image is sufficiently dried. In so doing, since disorder in the arrangement of the glitter pigments in the glitter region can be reduced, a colored glitter region (colored glitter image) with even more excellent colored metallic gloss is obtained.

According to aspects of the invention, colored metallic gloss refers to a state of having a color phase due to a colorant and having a metallic gloss due to a glitter pigment. Further, metallic gloss refers to the shininess, gloss, and the like which are characteristic of metals, and includes, for example, matt metallic gloss with a low level of glitter.

The colored metallic gloss can be determined by $[(C*45°)/(C*0°)]$. $[(C*45°)/(C*0°)]$ refers to the ratio between the saturation of the colored glitter region measured based on light reflected at an angle of −45 degrees ($C*45°$) and the saturation of the colored glitter region measured based on light reflected at an angle of 0 degrees ($C*0°$) when light is irradiated on the colored glitter region at an angle of 45 degrees, with the normal direction with respect to the colored glitter region as 0°. When $[(C*45°)/(C*0°)]$ is equal to or greater than 1, the colored metallic gloss is excellent. Further, it is preferable that $[(C*45°)/(C*0°)]$ be equal to or greater than 1 and equal to or less than 7, equal to or greater than 2 and equal to or less than 7 is more preferable, equal to or greater than 3 and equal to or less than 7 is even more preferable, and equal to or greater than 4 and equal to or less than 7 is particularly preferable. If $[(C*45°)/(C*0°)]$ is less than 1, the balance between the metallic gloss from the glitter pigment and the color phase from the colorant is lost, and the colored metallic gloss tends to be lowered.

"$C*45°$" and "$C*0°$" described above can be measured using a variable angle spectroscopic colorimeter. Specifically, "$C*45°$" is the saturation ($C*$) measured by receiving light reflected at an angle of −45 degrees when the measurement conditions of the variable angle spectroscopic colorimeter are set to the C light source, a viewing angle of 2 degrees, and a lighting angle of 45 degrees. Further, "$C*0°$" is the saturation ($C*$) measured by receiving light reflected at an angle of 0 degrees when the measurement conditions of the variable angle spectroscopic colorimeter are set to the C light source, a viewing angle of 2 degrees, and a lighting angle of 45 degrees. Examples of the variable angle spectroscopic colorimeter include the variable angle spectroscopic colorimeter "GC-5000" manufactured by Nippon Denshoku Industries Co., Inc., and the like. Here, the saturation ($C*$) is regulated as an $L*a*b*$ color system regulated by the International Commission on Illumination (CIE).

In the ink jet recording method according to the present embodiment, the ratio (W2/W1) between the amount of glitter pigment included in the glitter region [W1 (mg/inch$^2$)] and the amount of colorant included in the colorant glitter region [W2 (mg/inch$^2$)] is preferably equal to or greater than 0.1 and equal to or less than 1.5, more preferably equal to or greater than 0.1 and equal to or less than 1.0, even more preferably equal to or greater than 0.2 and equal to or less than 0.8, still more preferably equal to or greater than 0.2 and equal to or less than 0.7, and particularly preferably equal to or greater than 0.25 and equal to or less than 0.7. By the ratio (W2/W1) described above being within the above range and especially not falling below the lower limit, an image with excellent colored metallic gloss is obtained. Further, by the ratio (W2/W1) described above being within the above range and especially not exceeding the upper limit, an image with excellent glitter is obtained.

In the ink jet recording method according to the present embodiment, the 60° specular gloss in the colored glitter region is preferably equal to or greater than 100, and more preferably equal to or greater than 120. When the 60° specular gloss is equal to or greater than 100, the glitter of the colored glitter region tends to be excellent. The 60° specular gloss can be measured using, for example, the gloss meter "MultiGloss 268" (product name) manufactured by Konica Minolta Holdings, Inc. in accordance with Japanese Industrial Standard (JIS) Z8741:1997.

In the ink jet recording method according to the present embodiment, the 60° specular gloss in the glitter region (region before being colored) is preferably equal to or greater than 250, more preferably equal to or greater than 300, and even more preferably equal to or greater than 350. When the 60° specular gloss is equal to or greater than 250, the glitter of the colored glitter region in a case where the glitter region is later colored tends to be excellent.

3.2. Splitting of Nozzle Rows

The ink jet recording method according to the present embodiment can favorably use an aspect of splitting nozzle rows into groups including a predetermined number of nozzle holes. An ink jet recording method in a case where nozzle rows are split up and used will be described below with reference to FIG. 2.

As illustrated in FIG. 2, the nozzle rows 16A and 16B are used split into the first group located to the upstream side T1 in the sub scanning direction, and the second group located further to the downstream side T2 in the sub scanning direction than the first group.

First, glitter ink composition droplets are adhered on the recording medium P by causing glitter ink composition droplets to be discharged from the first group of the first nozzle row 16A while moving the carriage 4 in the main scanning direction. In so doing, a first glitter region formed of the glitter ink composition is obtained on the recording medium P.

Next, the recording medium P is moved in the downstream side T2 direction in the sub scanning direction by the length of the first group in the sub scanning direction. Furthermore, a first colored glitter region is obtained by causing colored ink composition droplets to be adhered to the first glitter region formed on the recording medium P by discharging colored ink composition droplets from the second group of the second nozzle row 16B while moving the carriage 4 in the main scanning direction. At this time, the surface of the first glitter region is sufficiently dried while the recording medium P is moved by the length of the first group. In so doing, the first colored glitter region formed on the first glitter region favorably suppresses mixing of inks, the glitter pigments are favorably arranged, and the colored metallic gloss is excellent.

Further, glitter ink composition droplets are adhered on the recording medium P by causing glitter ink composition droplets to be discharged once again from the first group of the first nozzle row 16A when forming the first colored glitter region (during the same scan of the carriage 4). In so doing, a second glitter region is formed on a portion where the first glitter region is not recorded (upstream side of the first glitter region in the sub scanning direction).

Next, the recording medium P is moved in the downstream side T2 direction in the sub scanning direction by the length of the second group in the sub scanning direction. Furthermore, a second colored glitter region is obtained by causing colored ink composition droplets to be adhered to the second glitter region formed on the recording medium P by discharging colored ink composition droplets from the second group of the second nozzle row 16B while moving the carriage 4 in the main scanning direction. At this time, the surface of the second glitter region is sufficiently dried while the recording medium P is moved by the length of the second group. In so doing, the second colored glitter region formed on the second glitter region favorably suppresses mixing of inks, the glitter pigments are favorably arranged, and the colored metallic gloss is excellent.

In such a manner, recording matter on which is formed a colored glitter region formed of the first colored glitter region and the second glitter region is obtained.

While a recording method of a colored glitter region formed of the first colored glitter region and the second colored glitter region has been shown in the present embodiment, without being limited thereto, a colored glitter region of a desired pattern can be formed by forming only the first colored glitter region or further repeating the process of forming the first colored glitter region and the second colored glitter region. Further, the same can also be performed in a case where the nozzle row is split into three or more.

The ink jet recording method according to the present embodiment can increase the speed of recording by splitting up and using the nozzle rows. Further, when the nozzle row is split up and used, backfeeding of the recording medium is not performed, or the number of times that backfeeding of the recording medium is performed can be reduced. In so doing, deviation of the printing position which tends to occur due to backfeeding of the recording medium can be reduced.

4. RECORDING MEDIUM

In addition to paper such as normal paper, specialized paper with an ink reception layer or the like, and the like, examples of the recording medium used in the ink jet recording method according to the present embodiment include base materials with which the region including the surface on which the ink is applied is configured by various plastics, ceramics, glass, metal, or composite materials thereof, and the like.

Further, the concentration of chlorine included in the recording medium according to the present embodiment is preferably equal to or less than 10 mass %, more preferably equal to or less than 5 mass %, even more preferably equal to or less than 3 mass %, and particularly preferably equal to or less than 2 mass %. If the concentration of chlorine included in the recording medium is equal to or less than 10 mass %, the gloss (60° specular gloss) of the colored glitter region tends not to decrease over time. While measurement of the chlorine concentration in the recording medium is not particularly limited, measurement can be performed using an SEM-EDX, for example.

The relationship between the gloss of the colored glitter region and the chlorine included in the recording medium will be described below with a case where silver particles are used as the glitter pigment as an example.

When a glitter ink composition containing silver particles is adhered on a recording medium, free chlorine molecules are generated and dissolved in water used as a solvent for the glitter ink composition. The free chlorine molecules are generated from the chlorine contained in the recording medium. It is commonly accepted in general chemistry that chlorine and silver, whether in a non-ionic state or an ionic state, react directly to form silver chloride, and a portion of the silver particles used as the glitter pigment become silver chloride.

As can be seen from the favorable use of silver chloride as a photosensitive material in silver halide photographic films, the silver chloride formed in the recording matter is photosensitive with respect to ultraviolet rays. It is considered that a decrease in the gloss of recording matter due to light occurs due to surface scattering of visible light due to coarse crystallized matter as sometimes coarse silver recrystallized matter is formed on the surface of the recording matter as a result of the silver chloride formed in the recording matter being exposed to light.

Therefore, if the glitter region is recorded on a recording medium with a high concentration of chlorine using a glitter ink composition containing silver particles as an example of the glitter pigment, while superbly excellent metallic gloss is obtained immediately after recording, there is a case where the gloss decreases compared to existing color ink (cyan, magenta, yellow, black, and the like) by the recording matter being exposed to light. In particular, while the reason is unclear, there is a case where a more pronounced decrease in the gloss occurs on the colored glitter region as the colorant and the silver chloride come into contact and the photosensitivity of the silver chloride increases.

Here, while the relationship between the gloss of the colored glitter region and the chlorine included in the recording medium is in a case where silver particles are used as the glitter pigment as an example, without being limited thereto, there is a case where the same phenomenon occurs even in a case where a glitter pigment other than silver is used.

5. EXAMPLES

While aspects of the invention will be described below more specifically using examples and comparative examples, the aspects of the invention are not limited to such examples.

5.1. Preparation of Ink 5.1.1. Preparation of Glitter Ink Composition

1 Preparation of Silver Ink Composition

Polyvinylpyrrolidone (PVP, weight-average molecular weight of 10,000) was heated for 15 hours at 70° C. before being cooled at room temperature. A PVP solution was prepared by adding 1000 g of the PVP to 500 ml of an ethylene glycol solution. A silver nitrate solution was prepared by placing 500 ml of an ethylene glycol solution into a separate container and adding and stirring 128 g of silver nitrate sufficiently using an electromagnetic stirrer. The reaction was advanced by stirring the PVP solution at 120° C. using an overhead mixer, adding the silver nitrate solution, and heating for approximately 80 minutes. The mixture was then cooled at room temperature. Centrifugation was performed on the obtained solution for 10 minutes using a centrifuge at 2200 rpm. The separated silver particles were then extracted before being added to the 500 ml of ethanol solution for removing excess PVP. Furthermore, the silver particles were extracted by further performing centrifugation. Furthermore, the extracted silver particles were dried using a vacuum dryer at 35° C. at 1.3 Pa.

The glitter ink with the material composition shown in Table 1 was prepared by using 10 mass % of the silver particles manufactured in such a manner. The Ag ink in the table represents a glitter ink composition containing silver as the pigment.

Specifically, the following were used as the components described in Table 1.

Glitter Pigment

Silver particles (refer to the method of manufacturing described above, a volume average particle diameter of 20 nm)

Colorant

PB15:3 (Pigment Blue 15:3, cyan pigment)

PV19 (Pigment Violet 19, magenta pigment)

PY74 (Pigment Yellow 74, yellow pigment)

Resin

Styrene-acrylic acid copolymer emulsion (Tg 85° C., volume average particle diameter of 130 nm)

Water-Soluble Organic Solvent

Glycerin 1,2-Hexanediol

Trimethylolpropane

Surfactant

Silicone-based surfactant (manufactured by BYK Japan Co., Ltd., product name "BYK-348")

Acetylene glycol-based surfactant (manufactured by Nissin Chemical Co., Ltd., product name "Olefin E1010")

pH Adjusting Agent

Triethanolamine

TABLE 1

| Ink composition | | Glitter ink Ag ink | Colored ink C ink | Colored ink M ink | Colored ink Y ink |
|---|---|---|---|---|---|
| Glitter pigment | Silver particles | 10 | | | |
| Colorant | PB15:3 | | 4 | | |
| | PV19 | | | 4 | |
| | PY74 | | | | 3 |
| Resin | Styrene-acrylic acid copolymer | | 2 | 2 | 2 |
| Water-soluble organic solvent | Glycerin | | 10 | 10 | 10 |
| | 1,2-Hexanediol | 3 | 5 | 5 | 5 |
| | Trimethylolpropane | 15 | | | |
| Surfactant | Silicone-based surfactant | | 0.5 | 0.5 | 0.5 |
| | Acetylene glycol-based surfactant | 1 | | | |
| pH adjusting agent | Triethanolamine | 0.3 | 0.9 | 0.9 | 0.9 |
| Ion exchanged water | | Remaining amount | Remaining amount | Remaining amount | Remaining amount |
| Total (mass %) | | 100 | 100 | 100 | 100 |

5.1.2 Preparation of Colored Ink Composition

1 Preparation of Pigment Dispersion Liquid

First, after sufficiently nitrogen-substituting the inside of a 2000 ml separable flask including a stirring apparatus, a reflux condenser, a temperature sensor, and a dropping funnel, 200.0 parts by mass of diethylene glycol monomethyl ether was placed in the separable flask and heated to 80° C. while being stirred. Next, 200.0 parts by mass of diethylene glycol monomethyl ether, 483.0 parts by mass of cyclohexyl acrylate (hereinafter referred to as "CHA"), 66.6 parts by mass of methacrylic acid (hereinafter referred to as "MAA"), 50.4 parts by mass of acrylic acid (hereinafter referred to as "AA"), and 4.8 parts by mass of t-butyl peroxy(2-ethylhexanoate) (hereinafter referred to as "BPEH") were placed in the dropping funnel and added dropwise to the separable flask at 80° C. over four hours. After the dropwise addition, the mixture was kept at 80° C. for one hour before adding 0.8 parts by mass of BPEH and reacting for another hour at 80° C. After maturing was ended, the diethylene glycol monomethyl ether was removed through distillation under reduced pressure. 600.0 parts by mass of methyl ethyl ketone (hereinafter referred to as "MEK") was then added to obtain an ink jet ink polymer composition solution with 50% resin solids. After drying a portion of the ink jet ink polymer composition solution obtained in such a manner for one hour using a high-heat dryer at 105° C., the acid value of the obtained solid of the ink jet ink polymer composition was 130 mgKOH/g, and the weight-average molecular weight was 34,000. Next, 6.0 parts by mass of a 30% aqueous sodium hydroxide was added to 120.0 parts by mass of the ink jet ink polymer composition solution before being stirred for five minutes using a high-speed disperser, and 480.0 parts by mass of a dispersion liquid including C.I. Pigment Yellow 74 with a pigment concentration of 25 mass % was further added and stirred for one hour using a high-speed disperser to obtain a pigment dispersion liquid.

Here, a pigment dispersion liquid was also obtained similarly to the above description for C.I. Pigment Blue 15:3 and C.I. Pigment Violet 19.

2 Preparation of Colored Ink Composition

A colored ink composition was prepared for each color of the material compositions shown in Table 1 using the pigment dispersion liquid prepared as described above. Each colored ink composition was prepared by placing the material shown in the table into a container, mixing and stirring for two hours using a magnetic stirrer, and removing impurities such as dirt and coarse particles through filtration using a membrane filter with a pore diameter of 5%. In the table, C ink indicates a cyan ink composition, M ink indicates a magenta ink composition, and Y ink indicates a yellow ink composition.

5.2. Evaluation Tests

The following evaluation tests were performed using an ink jet printer PX-G930 (product name, manufactured by Seiko Epson Corporation) on which cartridges filled with the ink compositions shown in Table 1 were fitted.

Here, the glitter ink composition and the colored ink composition were discharged with the duty values shown in Tables 2 and 3. Here, in the present specification, the "duty value" is a value calculated by the following formula.

Duty(%)=number of actually discharged dots/(vertical resolution×horizontal resolution)×100

(In the formula, the "number of actually discharged dots" is the number of actually discharged dots per unit area, and the "vertical resolution" and the "horizontal resolution" are respectively resolutions per unit area.)

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Glitter ink | Type | Ag ink | Ag ink | Ag ink | Ag ink | Ag ink | Ag ink | Ag ink | Ag ink | Ag ink | Ag ink |
| | Duty (%) | 50 | 50 | 50 | 50 | 50 | 50 | 50 | 50 | 50 | 50 |
| Colored ink | Type | C ink | C ink | C ink | C ink | C ink | M ink | M ink | M ink | M ink | M ink |
| | Duty (%) | 20 | 40 | 60 | 80 | 100 | 20 | 40 | 60 | 80 | 100 |
| | W2/W1 | 0.16 | 0.32 | 0.48 | 0.64 | 0.80 | 0.16 | 0.32 | 0.48 | 0.64 | 0.80 |
| Evaluation test | Colored metallic gloss C(45°)/C(0°) | 2.28 | 5.69 | 4.58 | 5.09 | 5.66 | 6.01 | 6.18 | 4.70 | 4.80 | 5.26 |
| | Determination | C | S | A | S | S | S | S | A | A | S |
| | 60° specular gloss | 262 | 175 | 143 | 125 | 121 | 266 | 184 | 131 | 115 | 110 |
| | Glitter (by sight) | A | A | B | B | C | A | A | B | B | C |
| | Overall determination | C | A | B | B | C | A | A | B | B | C |

TABLE 3

| | | Example 11 | Example 12 | Example 13 | Example 14 | Example 15 | Example 16 | Example 17 | Example 18 | Example 19 | Example 20 | Comparative Example |
|---|---|---|---|---|---|---|---|---|---|---|---|---|
| Glitter ink | Type | Ag ink | Ag ink | Ag ink | Ag ink | Ag ink | Ag ink | Ag ink | Ag ink | Ag ink | Ag ink | Ag ink |
| | Duty (%) | 50 | 50 | 50 | 50 | 50 | 40 | 40 | 40 | 40 | 40 | 0 |
| Colored ink | Type | Y ink | Y ink | Y ink | Y ink | Y ink | M ink | M ink | M ink | M ink | M ink | C ink |
| | Duty (%) | 20 | 40 | 60 | 80 | 100 | 20 | 40 | 60 | 80 | 100 | 50 |
| | W2/W1 | 0.16 | 0.32 | 0.48 | 0.64 | 0.80 | 0.20 | 0.40 | 0.60 | 0.80 | 1.00 | — |
| Evaluation test | Colored metallic gloss C(45°)/C(0°) | 3.85 | 5.53 | 5.46 | 4.95 | 4.30 | 4.81 | 3.32 | 3.11 | 3.22 | 3.15 | 0.84 |
| | Determination | B | S | S | A | A | A | B | B | B | B | D |
| | 60° specular gloss | 252 | 191 | 165 | 144 | 141 | 179 | 155 | 102 | 101 | 100 | 101 |
| | Glitter (by sight) | A | A | A | B | C | A | A | A | B | C | D |
| | Overall determination | B | A | A | B | C | B | B | B | B | C | D |

5.2.1. Creation of Evaluation Samples of Examples 1 to 20 and Comparative Example 1

Evaluation samples of Examples 1 to 20 were created as follows. First, glitter ink composition droplets were discharged from the printer described above to form a glitter region on a recording medium A (product name "Photo Paper (Glossy)" manufactured by Seiko Epson Corporation). Next, a colored glitter region was formed on the recording medium A by discharging the colored ink composition from the printer described above onto the glitter region. In so doing, evaluation samples for Examples 1 to 20 were obtained. Further, when the ink was applied, the nozzle rows were split up and used as described in "3.2. Splitting of Nozzle Rows", and after applying the glitter ink composition in advance, the colored ink composition was applied on the region in which the glitter ink composition was recorded.

On the other hand, for the evaluation sample of Comparative Example 1, a colored image was formed by discharging only the colored ink composition on the recording medium A without discharging the glitter ink composition. In so doing, an evaluation sample for Comparative Example 1 was obtained.

In Tables 2 and 3, W1 indicates the amount of glitter pigment included in the glitter region [W1 (mg/inch$^2$)], and W2 indicates the amount of colorant included in the glitter region [W2 (mg/inch$^2$)].

1 Colored Metallic Gloss

"C*45°" and "C*0°" of the colored glitter regions (a colored image in Comparative Example 1) of the evaluation samples obtained as described above were measured using the variable angle spectroscopic colorimeter GC-5000 (product name, manufactured by Nippon Denshoku Industries Co., Inc.). [(C*45°)/(C*0°)] was calculated based on the obtained values, and the colored metallic gloss was evaluated according to the following evaluation standards. Here, the measurement conditions using the variable angle spectroscopic colorimeter were a measurement light source of C, a viewing angle of 2°, and a projection angle of 45°.

S: excellent reproducibility of color phase due to colorant and metallic gloss due to glitter pigment, and excellent balance therebetween ([(C*45°)/(C*0°)]≥5)

A: excellent reproducibility of color phase due to colorant and metallic gloss due to glitter pigment, and good balance therebetween (5>[(C*45°)/(C*0°)]≥4)

B: good reproducibility of color phase due to colorant and metallic gloss due to glitter pigment, and good balance therebetween (4>[(C*45°)/(C*0°)]≥3)

C: somewhat good reproducibility of color phase due to colorant and metallic gloss due to glitter pigment, and somewhat good balance therebetween (3>[(C*45°)/(C*0°)]≥2)

D: At least one of reproducibility of color phase due to colorant and metallic gloss due to glitter pigment is not excellent, and the balance therebetween is not excellent either (2>[(C*45°)/(C*0°)])

2 60° Specular Gloss

The 60° specular gloss of the colored glitter regions (a colored image in Comparative Example 1) of the evaluation samples obtained as described above were measured according to JIS Z8741:1997 using a gloss meter (manufactured by Konica Minolta Holdings, Inc., product name MultiGloss 268).

3 Glitter (By Sight)

The glitter of the colored glitter regions (a colored image in Comparative Example 1) of the evaluation samples obtained as described above were observed by sight from a plurality of different angles using a regular light source D50. The evaluation standards were as follows.

A: Extremely strong glitter is seen
B: Clear glitter is seen
C: Weak glitter is seen
D: Glitter is not seen 4 Overall Determination The results of the evaluation tests described above were evaluated as a whole. The evaluation standards were as follows.

A: Lowest evaluation is A
B: Lowest evaluation is B
C: Lowest evaluation is C
D: Highest evaluation is D 5.2.2. Examples 1 to 5
1 Creation of Evaluation Samples For the evaluation samples of Examples 1 to 4, glitter ink composition droplets were discharged from the printer described above with the conditions shown in Table 4 to form glitter regions on recording media A to D. In so doing, evaluation samples for Examples 1 to 4 were obtained.

The types of recording media that were used were as follows. Further, the concentration of chlorine contained in the recording media was measured under the following conditions. The measurement apparatus was SEM-EDX, where SEM is S-4700 manufactured by Hitachi, Ltd. as a scanning electron microscope and EDX is Super Xerophy Model MS-818XI manufactured by Horiba, Ltd. The measurement conditions were an acceleration voltage of 15 kV, an emission current of 15 μA, a working distance of 15 mm, and a sampling time of 300 s. The measurement results are shown in Table 5.

Recording medium A (manufactured by Seiko Epson Corporation, product name "Photo Paper (Glossy)")

Recording medium B (manufactured by Seiko Epson Corporation, product name "Photo Paper Crispia (Super Glossy)")

Recording medium C (manufactured by Seiko Epson Corporation, product name "Photo Paper Entry (Glossy)")

Recording medium D (manufactured by Fujifilm Holdings Corporation, product name "Premium Plus Photo Paper Professional")

TABLE 4

|  |  | Example 1 | Example 2 | Example 3 | Example 4 |
|---|---|---|---|---|---|
| Glitter ink | Type | Ag ink | Ag ink | Ag ink | Ag ink |
|  | Duty (%) | 50 | 50 | 50 | 50 |
|  | Recording medium type | A | B | C | D |
| Evaluation test | 60° specular gloss (initial) | 609 | 601 | 605 | 601 |
|  | Ratio of fall in 60° specular gloss | 32 | 10 | 2 | 25 |

TABLE 5

| Element (mass %) | Recording medium A | Recording medium B | Recording medium C | Recording medium D |
|---|---|---|---|---|
| C | 12.85 | 18.86 | 12.34 | 25.61 |
| N | 7.79 | 0 | 0 | 0 |
| O | 44.45 | 44.82 | 49 | 40.33 |
| Al | 1.6 | 2.32 | 38.46 | 0 |
| Si | 32.6 | 34.27 | 0 | 31.56 |
| Cl | 1.26 | 1.73 | 0.2 | 2.5 |

2 Ratio of Decrease in 60° Specular Gloss

The 60° specular gloss of the glitter regions of the evaluation samples obtained as described above were measured according to JIS Z8741:1997 using a gloss meter (manufactured by Konica Minolta Holdings, Inc., product name "MultiGloss 268"). Here, the measured values (initial 60° specular gloss) before ozone exposure described later are shown in Table 4.

The evaluation samples were then exposed to ozone for 16 hours using an ozone weather meter OMS-H (product name, manufactured by Suga Test Instruments Co., Ltd.) under the conditions of a temperature of 23.0° C., a humidity of 50% RH, and an ozone concentration 5 ppm.

The 60° specular gloss of the glitter regions of the evaluation samples exposed to ozone was measured using a gloss meter (manufactured by Konica Minolta Holdings, Inc., product name "MultiGloss 268"), and the ratio of fall (%) from the initial values described above (the 60° specular gloss before the ozone exposure) was found.

5.3. Evaluation Results

As shown in the evaluation results of Tables 2 and 3, the colored metallic glitter regions obtained by the creation of the evaluation samples of Examples 1 to 20 all had excellent colored metallic gloss.

On the other hand, as shown in the evaluation results of Table 3, with Comparative Example 1, glitter ink was not used. There was therefore no colored metallic gloss.

It was shown from the evaluation results (Tables 4 and 5) of the evaluation samples according to Examples 1 and 4 that as the concentration of chlorine contained in the recording medium increases, the gloss of the image tends to decrease over time. From the evaluation results, it can be said that the gloss and the colored metallic gloss is decreased by the concentration of chlorine contained in the recording medium even in a case where a colored glitter region is recorded. Here, while the concentration of chlorine contained in the recording medium A is lower than the concentration of chlorine contained in the recording media B and D, the ratio of decrease in the specular gloss of the recording medium A is greater than the ratio of decrease in the specular gloss of the recording media B and D, reversing the relationship between the chlorine concentration and the ratio of decrease of the specular gloss. The reason is that the configuration of the layers of the recording medium, the thickness of the ink accommodating layer, and the like differ for each type of recording medium, and there is a fixed difference in locations containing more chlorine for each recording medium. That is, if the concentrations of regions with the greatest chlorine concentration are compared for each recording medium, it is strongly conjectured that the recording medium A is higher than the recording media B and D.

5.4. Others

The application method of ink composition of Example 4 was changed from application through the splitting of nozzles described above to the following. That is, the glitter ink composition and the colored ink composition were applied on the same landing point at the same carriage scanning timing (that is, applied so that the ink droplets of each mix at the landing point). The recording matter obtained as a result had very poor 60° specular gloss, glitter, and the like. While aspects of the invention of the present application are not limited to application through the splitting of nozzles, in order for the colored glitter, the 60° specular gloss, and the like of the aspects of the invention of the present application to have favorable values, it was found that it is preferable to use an application method in which the nozzles are split.

The aspects of the invention are not limited to the embodiments described above, and various modifications are possible. For example, the aspects of the invention include essentially the same configurations as the configurations described in the embodiments (for example, a configuration in which the functions, methods, and results are the same, or a configuration in which the object and the effects are the same). Further, the aspects of the invention also include configurations in which non-essential portions of the configurations described in the embodiments are substituted. Further, the aspects the invention include configurations demonstrating the same operation effects or configurations achieving the same objects as the configurations described in the embodiments. Further, the aspects of the invention include configurations in which common technologies are added to the configurations described in the embodiments.

What is claimed is:

1. An ink jet recording method comprising:
   discharging droplets of a glitter ink composition containing a glitter pigment onto a recording medium to form a glitter region on the recording medium; and
   discharging a colored ink composition containing a colorant onto the glitter region to form a colored glitter region on the recording medium,
   wherein when light is irradiated on the colored glitter region at an angle of 45 degrees, with a normal direction with respect to the colored glitter region as 0 degrees, a ratio $[(C^*45°)/(C^*0°)]$ between a saturation of the colored glitter region measured based on light reflected at an angle of −45 degrees ($C^*45°$) and the saturation of the colored glitter region measured based on light reflected at an angle of 0 degrees ($C^*0°$) is equal to or greater than 1.

2. The ink jet recording method according to claim 1, wherein a 60° specular gloss of the colored glitter region is equal to greater than 100.

3. Recording matter obtained by the ink jet recording method according to claim 2.

4. The ink jet recording method according to claim 1, wherein a 60° specular gloss of the glitter region is equal to greater than 250.

5. Recording matter obtained by the ink jet recording method according to claim 4.

6. The ink jet recording method according to claim 1, wherein a concentration of chlorine included in the recording medium is equal to or less than 10 mass %.

7. Recording matter obtained by the ink jet recording method according to claim 6.

8. The ink jet recording method according to claim 1, wherein a ratio (W2/W1) between an amount of the glitter pigment included in the glitter region [W1 (mg/inch$^2$)] and an amount of the colorant included in the colored glitter region [W2 (mg/inch$^2$)] is equal to or greater than 0.1 and equal to or less than 1.5.

9. Recording matter obtained by the ink jet recording method according to claim 8.

10. The ink jet recording method according to claim 1, wherein the glitter ink composition and the colored ink composition further contain water.

11. Recording matter obtained by the ink jet recording method according to claim 10.

12. The ink jet recording method according to claim 1, wherein a head including a nozzle row formed of a plurality of nozzle holes and a carriage scanning the head in a main scanning direction are included,
    the nozzle row includes a first nozzle row formed by arranging a plurality of nozzle holes for discharging the glitter ink composition in a sub scanning direction intersecting the main scanning direction, and a second nozzle row formed by arranging a plurality of nozzle holes for discharging the colored ink composition in the sub scanning direction,
    the first nozzle row and the second nozzle row are used by being split into each group including a predetermined number of nozzle holes toward the sub scanning direction,
    the groups include a first group located to an upstream side in the sub scanning direction and a second group located further to a downstream side than the first group in the sub scanning direction,
    forming the glitter region is performed by discharging the glitter ink composition from the first group of the first nozzle row, and
    forming the colored glitter region is performed by discharging the colored ink composition from the second group of the second nozzle row.

13. Recording matter obtained by the ink jet recording method according to claim 12.

14. Recording matter obtained by the ink jet recording method according to claim 1.

* * * * *